United States Patent [19]
Greene

[11] 3,807,970
[45] Apr. 30, 1974

[54] DRILL PROOF PLATE FOR SAFES

[76] Inventor: Charles H. Greene, 7104 W. Aracoma, Cincinnati, Ohio 45237

[22] Filed: June 8, 1967

[21] Appl. No.: 659,828

Related U.S. Application Data

[63] Continuation of Ser. No. 395,127, Sept. 9, 1964, abandoned.

[52] U.S. Cl. .............................. 29/196, 29/191.4
[51] Int. Cl. .............................................. B32b 15/00
[58] Field of Search .... 29/191.2, 191.4, 195, 182.3, 29/182.7, 196

[56] References Cited
UNITED STATES PATENTS

| | | | |
|---|---|---|---|
| R21,730 | 2/1941 | Schwarzkopf | 29/182.7 |
| 936,389 | 10/1909 | Wadsworth | 29/191.2 |
| 1,815,187 | 7/1931 | Coles | 29/191.4 |
| 2,372,607 | 3/1945 | Schwarzkopf | 29/191.4 |
| 1,977,128 | 10/1934 | Hawkins | 29/191.2 X |
| 2,398,132 | 4/1946 | Cottrell | 29/195 |
| 3,066,402 | 12/1962 | Ingels | 29/191.2 X |
| 3,380,861 | 4/1968 | Frehn | 29/182.7 X |

*Primary Examiner*—Hyland Bizot
*Attorney, Agent, or Firm*—John W. Melville; Albert E. Strasser; Stanley H. Foster

[57] ABSTRACT

A plate structure for safes, vaults and the like, and a method of making it, wherein the plate comprises two or more metallic sheets fused together to form a unitary structure. The plate structure has a barrier layer of hard particles such as carbide particles and the like embedded in the line of fusion between adjacent metallic sheets. Adjacent metallic sheets are provided with layers of borax and a layer of hard particles therebetween, heated to a temperature of from 2,300° F to 2,400° F and subjected to a pressure in the order of 2,500 tons.

7 Claims, 4 Drawing Figures

PATENTED APR 30 1974

3,807,970

INVENTOR.
CHARLES H. GREENE,

BY
Yungblut, Melville, Strasser & Foster

ATTORNEYS.

DRILL PROOF PLATE FOR SAFES

CROSS-REFERENCE TO RELATED APPLICATION

This application is a continuation of the copending application in the name of the same inventor, Ser. No. 395,127, filed Sept. 9, 1964 now abandoned and entitled DRILL PROOF PLATE FOR SAFES AND METHOD OF MAKING SAME.

BACKGROUND OF THE INVENTION

1. Field of Invention

This invention relates to plates for use in the construction of burglar-proof safes or vaults, and has to do more particularly with plates which consist of two or more sheets of steel which are joined together by fusion with a thin barrier layer of carbide particles therebetween which, during the course of fabrication of the plate, become embedded in the fused surfaces of the sheets so as to provide an essentially unitary structure having an integral barrier which cannot be penetrated by a drill.

2. Description of the Prior Art

Numerous expedients have hitherto been proposed to provide steel plate for safes and vaults which is resistant to attack by a drill. For example, it has hitherto been proposed to form plate composed of plies of hardened and soft or mild steel, the hardened ply or plies being resistant to drilling, whereas the soft ply or plies act to prevent shattering of the hardened plies, which are essentially brittle. However, even in such composite structures the resistance to drilling is a function of time, depending upon the degree of hardness developed in the sheets. Thus, the number of minutes that a plate of given thickness will resist penetration by a drill is the usual criteria for determining the acceptability of the plate for safe and vault purposes. Plate which will withstand drilling for 15–18 minutes is deemed highly desirable, yet is rarely achieved in thicknesses which would be commercially suitable for use in safes and vaults.

In contrast to the foregoing, the present invention contemplates the provision of laminated steel or other metallic plate of two or more plies fused together to form a unitary structure. The laminated plate incorporates a barrier layer of abrasive particles, such as carbide particles, at the line or lines of fusion. The barrier layer renders the plate literally drill proof in that a drill bit, upon striking the barrier layer, will be shattered and hence rendered useless. The laminated plate is of such character that the integrity of the barrier layer is maintained while at the same time the abrasive particles making up the drill proof barrier are caused to be embedded in the fused surfaces of the metallic sheets in contact therewith. The invention further contemplates the provision of manufacturing techniques and procedures which result in the formation of laminated plate in an economical and facile manner, including procedures for accurately and uniformly depositing the barrier forming particles between the sheets without waste.

SUMMARY OF THE INVENTION

The invention relates to plate structure for safes, vaults and the like. The plate structure comprises two or more plies or laminations of metallic sheet material fused directly together to form a unitary structure with a barrier layer of hard particles embedded in the line or lines of fusion.

The metallic sheet material may be of any desired type including, for example, iron, hardened steel, mild or relatively soft steel and the like. The plate may comprise laminations of both hard and mild steels. The particles forming the barrier layer may be carbide particles, or particles of other material having comparable abrasive properties.

The metallic sheets to be fused together are provided with intermediate layers of borax and barrier particles. The laminated structure so formed is preferably heat treated in two stages, the first stage having a temperature range of from about 1,700° F to about 1,850° F and the second stage having a temperature range of from about 2,300° F to 2,400° F. While still hot, the plate structure is transferred to a press and subjected to pressure on the order of 2,500 tons.

The invention further relates to a method of insuring that the barrier layer of abrasive particles between the fused metallic sheets is thin and uniform throughout. During the formation of the structure, prior to the heat treatment, a uniform layer of the abrasive particles is formed on a carrier web of paper or the like coated with a pressure sensitive adhesive or similar tacky substance. The carrier web is used to locate the uniform layer of particles between the metallic plies, and the web itself is destroyed during the heat treatment.

The plate structure of the present invention may be subjected to various finishing treatments of known character when desired.

DESCRIPTION OF THE PREFERRED EMBODIMENTS

In the practice of the invention, the laminated plate will be formed from two or more plies or laminations of metal sheets, preferably iron or steel sheets. Such sheets may be of any desired type, depending upon the conditions of use to be satisfied by the finished product. For most safe and vault applications, two sheets will be employed, one of which is a hardened steel, such as ball bearing steel, whereas the other sheet will comprise a mild or relatively soft steel. Such combination is particularly desirable in that the two sheets compliment each other in that the hardened sheet, while resistant to penetration in its own right, is inherently brittle and subject to being shattered, whereas the mild steel, being relatively soft, flexes and bends under impact and hence lends high impact strength to the composite structure.

The thickness of the individual sheets making up a given plate does not constitute a limitation on the invention, and the sheets may be of the same or different thicknesses. For most safe and vault applications, sheets having a thickness of from ⅛ to ¼ inches are usually employed. The sheets should be of the same over-all dimensions so as to coincide one with the other; and they should be flat and free from curves, buckles and troughs which would interfere with their union.

In preparing the sheets for lamination, they will be suitably cleaned and degreased, whereupon the structure to be laminated may be built up as follows:

a. One of the sheets will be placed in a horizontal position, whereupon a layer of borax will be applied to its uppermost surface.

b. A thin layer of carbide particles is next applied, preferably by means of a paper carrier web as will be explained more fully hereinafter.

c. The remaining steel sheet is placed on top, after the application of another layer of borax.

In the preferred embodiment at least one layer of a mixture of borax and small, irregular steel chips or particles is located adjacent the layer of carbide particles. It is within the scope of the invention to locate a layer of a mixture of borax and steel particles both below and above the layer of carbide particles.

The composite structure so formed is then ready for heat treatment to join the steel sheets and interposed barrier layer together into a unitary structure. The heat treating operation is preferably conducted in two stages, the first comprising a preheating step wherein the plate forming structure is placed in a furnace and heated to a temperature of from 1,700°–1,850° F., whereupon the plate structure is transferred to a high heat furnace and brought to a temperature of from about 2,300° F to 2,400° F.

Figure 1:
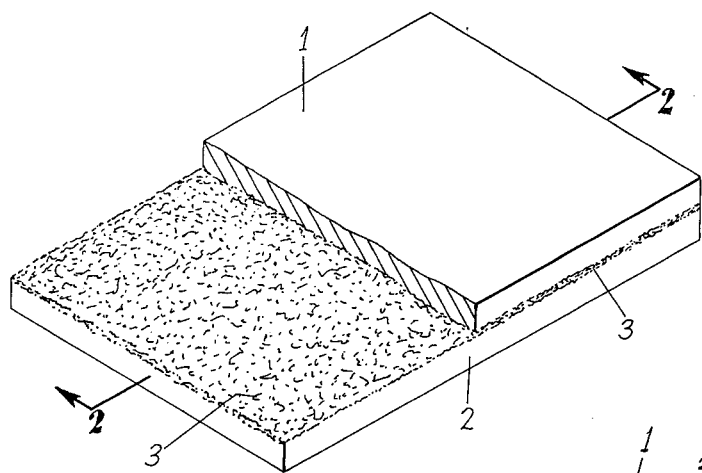
FIG. 1 is a fragmentary view with parts broken away of a laminated steel plate incorporating an intermediate barrier layer in accordance with the instant invention.
Figure 2:
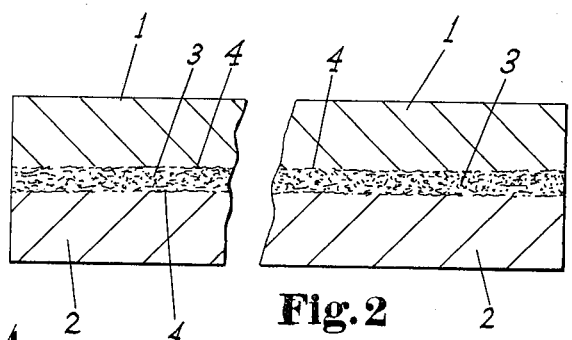
FIG. 2 is an enlarged fragmentary vertical sectional view taken along the line 2—2 of FIG. 1.

The above temperature range is not of such magnitude as to impair the hardness characteristics of the steel sheets. Nevertheless, at this temperature range the borax acts to raise the temperature of the adjacent surfaces of the steel sheets to the melting point, whereby to permit fusion of the sheets to form a unitary plate structure. The borax further serves to prevent oxidation of the adjacent sheet surfaces prior to fusion. Thus, as seen in FIGS. 1 and 2, the sheets 1 and 2 are joined together with the barrier layer 3 of abrasive particles therebetween.

The plate structure need not be clamped, banded or otherwise confined during the heat treating operation. However, upon removal of the plate structure from the heat treating furnace, it is transferred to a press wherein the sheets are pressed together while still in the heated condition. In an exemplary embodiment, a press pressure on the order of 2,500 tons is employed. The pressing operation serves to effect allover intimate union between the adjacent surfaces of the sheets and to eliminate voids. The carbide particles are embedded in the steel sheets themselves, as indicated at 4 in FIG. 2. Consequently, while the barrier layer retains its integrity as a discernible layer, the carbide particles are nonetheless embedded in and interlocked with the fused surfaces of the steel sheets in an essentially irregular manner. Where steel particles are used in addition to the carbide particles, they too are similarly embedded and together with the carbide particles serve in part at least to mechanically join the steel sheets, in addition to the fusion.

The type and grade of carbide particles employed to form the barrier layer does not constitute a limitation on the invention, although tungsten carbide particles having a granule size on the order of 0.035 inches have been found to be highly effective. It is preferred to employ particles which are of irregular shape since they can be more effectively embedded in the surfaces of the steel sheet to provide rough edges which are more effective in damaging and destroying a drill bit brought in contact therewith. Where steel particles are also used, they may be of a similar size or smaller, and are also preferably irregular in shape.

Figure 3:
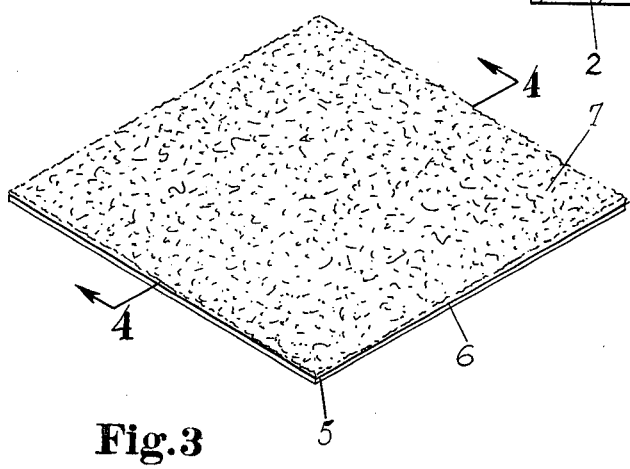
FIG. 3 is a perspective view illustrating the initial formation of the barrier layer and adhesively coated carrier web.
Figure 4:
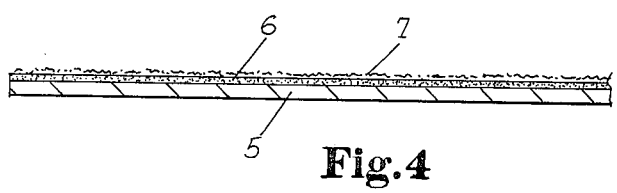
FIG. 4 is an enlarged fragmentary vertical sectional view taken along the line 4—4 of FIG. 3.

In order to insure uniform and even distribution of the carbide particles so as to insure the over-all continuity of the barrier layer, it has been found highly desirable to preform the barrier layer on a carrier web. Preferably, and as seen in FIGS. 3 and 4 of the drawings, the carrier web may comprise a sheet of paper or the like 5 having a coating of pressure sensitive adhesive or other similar tacky substance 6 applied to one surface thereof. The carbide particles 7 are spread over the tacky surface and adhere thereto. An excess quantity of particles will be initially applied to the carrier web, whereupon the particles may be brushed or otherwise spread so as to fully cover the entire extent of the web. Excess particles may then be removed and collected for reuse by inclining the web and shaking the loose particles from it. Shaking of the web may also be employed to insure allover coverage of the web prior to the removal of excess particles. The end result of the operation is the formation of thin, essentially uniform layer of carbide particles which can be readily handled and placed in position between the steel sheets making up the plate. In addition to assuring a thin uniform layer of carbide particles, the use of the carrier web effects a substantial savings in material, the carbide particles being quite expensive. It has been found that it is extremely difficult to reclaim excess particles if they are simply spread onto the surface of one of the plates as the structure is built up.

The carrier web will disintegrate during the heating operation, as will the adhesive material, and consequently the carrier web in no way interferes with the fusing of the steel sheets.

Subsequent to the heat treatment and pressing of the composite structure, the resultant plate may be subjected to various finishing treatments. For example, the plate may be reheated to a temperature on the order of 2,300° F. and then hot rolled. The plate also may be annealed to refine the grain in the ball bearing steel. In an exemplary practice, the plate is annealed at a temperature on the order of 1,650° F. Such anneals may be followed by a leveling or straightening operation, with or without grinding of the exposed surfaces of the plate. Additional hardening may be effected by a further heat treatment at a temperature on the order of 1,450°–1,475° F., followed by a quench in brine. Such finishing treatments are all of known character and will be understood by the worker in the art.

Steel plate produced in accordance with the instant invention will be normally utilized in safe and vault construction with the hardened surface outermost. When attacked by a drill, the bit will ultimately penetrate the hardened outer sheet, but when the bit reaches the barrier layer, it will encounter the rough and irregularly disposed edges of the carbide particles which tear into the bit and destroy it. This is true even though the drill bit is repeatedly replaced and the new bit caused to enter the same hole in the outermost steel plate. The thin barrier layer of carbide particles (and steel particles, if used) does not interfere with the fusion of the steel sheets. It would appear, however, that the particles serve to reinforce and enhance the fusion between the sheets by reason of the interlocking action which takes place. Where openings are required in the plate, such openings can be provided utilizing an extremely heavy duty press. Such equipment would not be available to anyone seeking to enter a safe or vault at its place of installation.

Modifications may be made in the invention without departing from its spirit and purpose. For example, while the invention has been described in conjunction with a plate composed of two steel sheets having an intermediate barrier layer, it will be readily apparent that a composite structure composed of three or more sheets may be provided, together with an additional barrier layer for each additional sheet. Similarly the composition of the sheets does not constitute a limitation on the invention, and diverse combinations of steel and/or other metallic plates may be employed. While carbide particles constitute the preferred barrier material, other materials having abrasive properties comparable to carbide could be employed, as long as such particles are effective in damaging and destroying drill bits.

The embodiments of the invention in which an exclusive property or privilege is claimed are defined as follows:

1. A plate structure comprising at least two metallic sheets, said sheets being fused directly together, a barrier layer, said barrier layer comprising discrete highly abrasive particles, said particles being uniformly dispersed and embedded in the line of fusion between said metallic sheets.

2. The structure claimed in claim 1 wherein said particles are carbide particles.

3. The structure claimed in claim 1 wherein said particles are tungsten carbide particles.

4. The structure claimed in claim 1 wherein said barrier layer comprises a mixture of carbide particles and steel particles.

5. The structure claimed in claim 1 wherein at least one of said metallic sheets is composed of hardened steel.

6. The structure claimed in claim 1 wherein at least one of said metallic sheets is composed of a mild steel.

7. The structure claimed in claim 1 wherein said abrasive particles are of irregular shape.

* * * * *